US011410038B2

(12) United States Patent
Lin et al.

(10) Patent No.: US 11,410,038 B2
(45) Date of Patent: *Aug. 9, 2022

(54) FRAME SELECTION BASED ON A TRAINED NEURAL NETWORK

(71) Applicant: Adobe Inc., San Jose, CA (US)

(72) Inventors: Zhe Lin, Fremont, CA (US); Xiaohui Shen, San Jose, CA (US); Radomir Mech, Mountain View, CA (US); Jian Ren, Piscataway, NJ (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,370

(22) Filed: Mar. 17, 2021

(65) Prior Publication Data

US 2021/0201150 A1 Jul. 1, 2021

Related U.S. Application Data

(63) Continuation of application No. 15/866,129, filed on Jan. 9, 2018, now Pat. No. 10,990,877.

(51) Int. Cl.
*G06N 3/08* (2006.01)
*G06K 9/62* (2022.01)
*G06F 16/783* (2019.01)
*G06N 3/04* (2006.01)
(Continued)

(52) U.S. Cl.
CPC ............ *G06N 3/08* (2013.01); *G06F 16/784* (2019.01); *G06K 9/6256* (2013.01); *G06N 3/0454* (2013.01); *G06N 3/084* (2013.01); *G06V 20/46* (2022.01); *G06V 40/16* (2022.01)

(58) Field of Classification Search
USPC .................................. 706/6, 15, 25, 38, 41
See application file for complete search history.

(56) References Cited

U.S. PATENT DOCUMENTS

| | | | |
|---|---|---|---|
| 6,075,884 A * | 6/2000 | Lubin | G06K 9/66 375/E7.13 |
| 10,666,962 B2 * | 5/2020 | Wang | H04N 19/136 |

OTHER PUBLICATIONS

U.S. Appl. No. 15/866,129, Notice of Allowance, dated Dec. 17, 2020, 9 pages.

(Continued)

*Primary Examiner* — Yosef K Laekemariam
(74) *Attorney, Agent, or Firm* — Kilpatrick Townsend & Stockton LLP

(57) ABSTRACT

Various embodiments describe frame selection based on training and using a neural network. In an example, the neural network is a convolutional neural network trained with training pairs. Each training pair includes two training frames from a frame collection. The loss function relies on the estimated quality difference between the two training frames. Further, the definition of the loss function varies based on the actual quality difference between these two frames. In a further example, the neural network is trained by incorporating facial heatmaps generated from the training frames and facial quality scores of faces detected in the training frames. In addition, the training involves using a feature mean that represents an average of the features of the training frames belonging to the same frame collection. Once the neural network is trained, a frame collection is input thereto and a frame is selected based on generated quality scores.

20 Claims, 12 Drawing Sheets

(51) Int. Cl.
  *G06V 20/40* (2022.01)
  *G06V 40/16* (2022.01)

(56) References Cited

OTHER PUBLICATIONS

Chang et al., "Automatic Triage for a Photo series", ACM Transactions on Graphics, vol. 35, Issue No. 4, Article 148, Jul. 2016, 10 pages.
Iandola et al., "SqueezeNet: AlexNet-Level Accuracy with 50x Fewer Parameters and <0.5MB Model Size", proceedings of the ICLR 2017 Conference, Nov. 4, 2016, 13 pages.
Krizhevsky et al., "ImageNet Classification with Deep Convolutional Neural Networks", Advances in Neural Information Processing Systems, vol. 25, No. 2, Jan. 2012, pp. 1-9.
Li et al., "A Convolutional Neural Network Cascade for Face Detection", In Proceedings of the IEEE Conference on Computer Vision and Pattern Recognition CVPR, Jun. 7-12, 2015, pp. 5325-5334.
Ren et al., "Best Frame Selection in a Short Video", Association for the Advancement of Artificial Intelligence, 2017, 8 pages.
Szegedy et al., "Going Deeper with Convolutions", Proceedings Of The IEEE Conference On Computer Vision And Pattern Recognition, Jun. 7-12, 2015, pp. 1-9.
Wang et al., "Event-Specific Image Importance", In proceedings of the IEEE Conference on Computer Vision and Pattern Recognition, 2016, pp. 4810-4819.

* cited by examiner

FRAME SELECTION BASED ON A TRAINED NEURAL NETWORK

CROSS-REFERENCE TO RELATED APPLICATION

This application is a continuation application of U.S. application Ser. No. 15/866,129, entitled "Frame Selection Based on A Trained Neural Network," filed Jan. 9, 2018, the disclosure of which is hereby incorporated by reference in its entirety.

TECHNICAL FIELD

The application relates to performing frame selection in an accurate and computationally efficient manner by training and using a neural network.

BACKGROUND

Computing devices provide various frame-related applications to users. Commonly, such applications support different functionalities such as capturing, editing, and viewing frames related to a scene. The frames may be available from a short video or an image burst of the scene. Another supported functionality is frame selection. Frame selection generally refers to automatically selecting a frame or a subset of the frames given the frame qualities, such as by finding the ones that have the best frame quality. Various approaches have been adopted in the industry for frame selection.

One existing approach relies on heuristic rules that specify a frame selection based on a number of criteria. The criteria can relate to a selection type. For instance, the frame is randomly selected. In another illustration, the first or last frame is selected. Alternatively, the criteria can related to the frames and include, for example, lighting, brightness, blur, presence of faces, face sizes, compositions, and other frame-related criteria. In this way, the quality of each frame is assessed against the criteria and the frame having the best quality can be selected. Although computationally efficient, this approach can be inaccurate because the heuristics rules may not use an optimal set of criteria. To improve the accuracy, the industry has recently shifted to neural networks, thereby trading off computational efficiency for accuracy.

A prominent neural network approach is that of Chang et al., described in "automatic triage for a photo series," authored by Chang, H.; Yu, F.; Wang, J., Ashley, D., and Finkelstein A., and published in ACM Trans. Graph 35(4): 148:1-148:10 (2016). Briefly, this approach trains a neural network by comparing images such that the neural network learns image features that indicate good quality. However, this approach suffers from a number of technical drawbacks.

First, the neural network is not trained to learn facial features. Thus, the resulting frame selection may not perform well for frames that include faces.

Second, the training can bias the neural network in an inaccurate manner. In particular, the training uses two frames at a time and bias the neural network such that one frame (e.g., a first frame) is considered as having a good quality and the other one (e.g., a second frame) as having a bad quality. However, in many situations, the two frames could have comparable qualities. Hence, when both have a good quality, the neural network inaccurately learns that features of the second frame indicate bad quality. Conversely, when the two frames have a bad quality, the neural network inaccurately learns that features of the first frame indicate good quality. As a result, the accuracy of the frame selection is not optimal.

Third, the training of the neural network is computationally burdensome. Specifically, all permutations of two frames are considered. Hence, if there are one hundred training frames per training scene, the neural network processes about five thousand frame sets. In the training, there could be thousands of training scenes and, thus, over five million frames sets would be processed.

SUMMARY

Embodiments of the present disclosure are directed to, among other things, performing accurate frame selection by training and using a neural network in a computationally efficient manner. In an example, a computer system accesses training data that includes training frames and training labels. The training frames are associated with a same scene. Each training label is associated with a training frame of the training frames and indicates a quality of the training frame. The computer system trains the neural network based on the training data. The training includes generating a training pair that includes a first training frame and a second training frame from the training frames. The training pair is generated based on the first training frame having a higher quality than the second training frame according to the training labels. The training also includes generating a first quality difference between the first training frame and the second training frame in the training pair based on a comparison of a first training label and a second training label. The first training label is associated with the first training frame. The second training label is associated with the second training frame. The training also includes inputting the training pair to the neural network. The training also includes generating a second quality difference in response to inputting the training pair. The second quality difference is generated based on an estimation of qualities of the first training frame and the second training frame according to parameters of the neural network. The training also includes updating the parameters of the neural network by at least minimizing a loss function of the neural network based on the first quality difference and the second quality difference. Upon completion of the training, the computer system selects the frame from a collection of frames at least by inputting the collection of frames to the neural network and by ranking the frames in the collection based on an estimation of qualities of the frames according to the parameters of the neural network.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
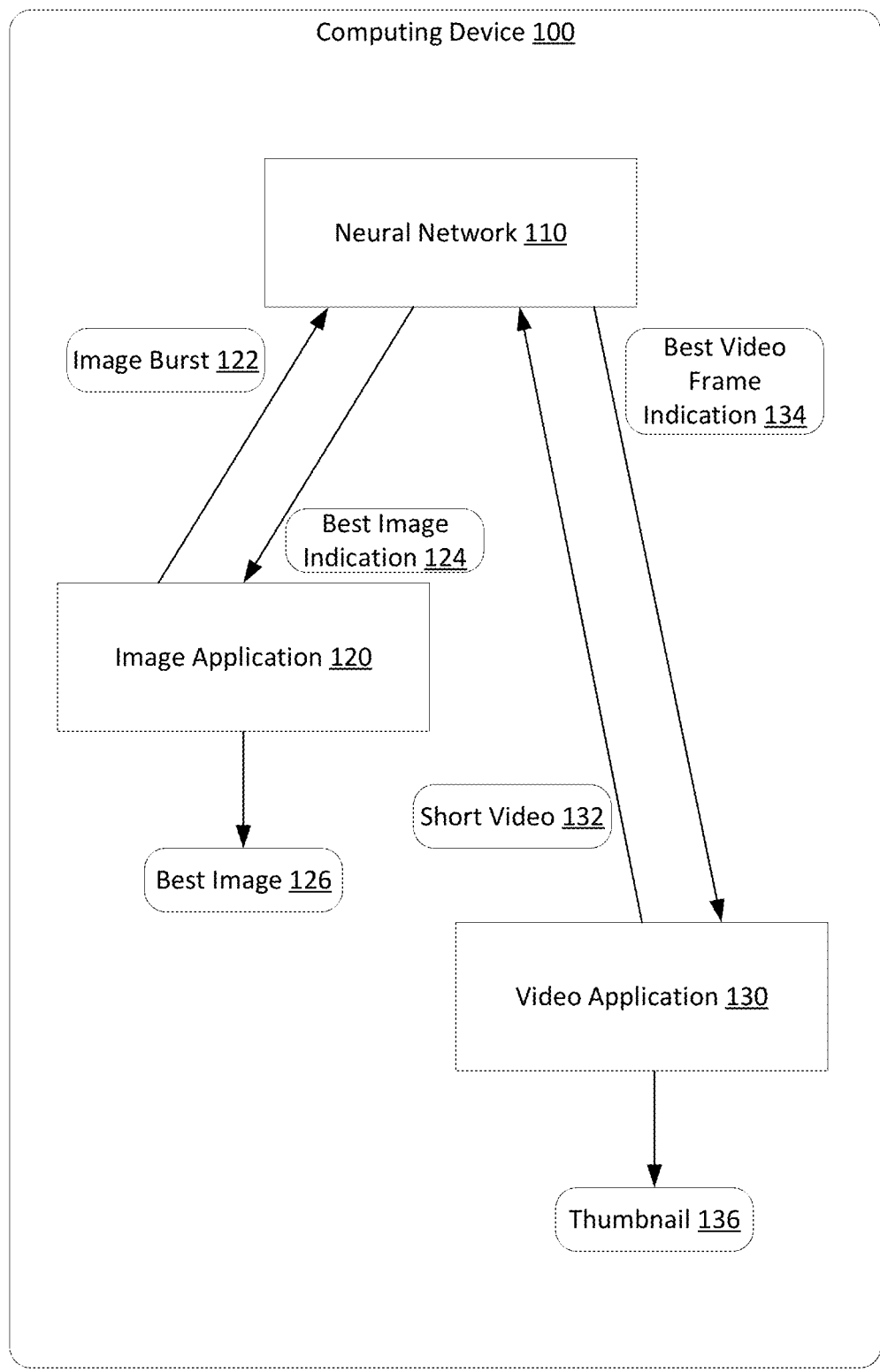
FIG. 1 illustrates examples of using a neural network for frame selection, according to certain embodiments of the present disclosure.

Embodiments of the present disclosure relate to performing accurate frame selection by training and using a neural network in a computationally efficient manner. Relative to existing neural network approaches, the accuracy is increased based on a number of features. First, the training relies on a difference between the quality of two training frames in a training pair. For example, the loss function of the neural network varies based on the quality difference. In this way, if the two training frames are of similar quality, the neural network is not biased to consider one them as being of good quality and the other one as being of bad quality. Second, the training involves facial recognition by considering features generated for detected faces and quality scores of the detected faces as presented in the training frames. In this way, the neural network performs well for scenes that include faces. Third, the training can also incorporate a feature mean to assess a training frame globally across the training scene. The feature mean represents an average feature map of the different training frames in the training scene. In this way, features of the training frame can be assessed against the global features of the scene. Also relative to existing neural approaches, the computational burden (e.g., processing power, computational cycles, memory usage, etc.) is significantly reduced. In particular, a much smaller number of frame pairs are needed to achieve the accuracy. For example, during the training, the use of twenty training pairs per training scene of a hundred training frames can be sufficient (while in, for example, the Chang neural network, the use of five thousand frame sets may be needed).

In an example, the training of the neural network relies on training data that includes training frames and training labels. Training scenes are available from storage and capture common daily activities. Each training scene is uniformly sub-sampled to select a small number of training frames, such as nineteen of them. Each training frame is associated with a training label that indicates a quality of the training frame. For instance, the training label is a quality score within a predefined range. Further, training pairs are generated for each training scene by, for instance, setting the training frame with the best quality as an element in each of the training pairs and varying the second element across the training pairs. Hence, out of the nineteen training frames of a scene, eighteen training pairs are generated. For each of such pairs, an actual quality difference is computed for the two training frames based on the relevant training labels. These actual quality differences are set as ground truths.

Next, the training pairs are input to the neural network. In turn, the neural network generates a quality score for each training frame in a training pair. An estimated quality difference is generated per training pair by comparing the quality scores of the training frames in that pair. Hence, a ground truth (e.g., an actual quality difference) and an estimated quality difference are available for each training pair, where the ground truth is derived from the training labels and the quality difference is derived from the neural network. The parameters of the neural network are updated to minimize a loss function that varies based on the ground truth. This variability of the loss function ensures that the parameters are properly updated in situations when the actual difference in quality between two training frames in a training pair is small (e.g., both have comparable qualities).

Additionally to using a variable loss function, the neural network is trained based on facial recognition. In an example, a heatmap is generated for each training frame and a face quality score is computed for each face present in the heatmap (or, equivalently, in the training frame). The heatmap of a training frame is input to a convolutional kernel to derive a feature map. During usage of the training frame, the feature map is added to the features generated by the neural network for the training frame. In this way, features about detected faces available from a feature map of heatmap are a part of the training. Furthermore, the face quality score for detected faces in the training frame is also used to update the parameters of the neural network. For instance, an estimated quality difference generated by the neural network based on the training frame is updated based on the face quality score. In this way, the loss function also accounts for the facial qualities in the training frames, thereby further improving the performance of the neural network for frames that include faces.

Further, the training can assess each training frame against the global features of the relevant training scene. In an example, each training frame of a training scene is input to the neural network to generate features for the training frame. The features of the different training frames are then averaged to generate a feature mean for the training scene. Any time one of training frames is used in the training, the feature mean is subtracted from the features generated by the neural network for that training frame. In this way, each training frame is assessed globally by comparing its features to the global features of the scene and by performing the training in light of this comparison. Hence, a feature unique to a training frame is not subtracted and is analyzed during the training to learn whether it adds to the quality of the training frame or not. Conversely, a feature common across the training frames is subtracted and is, thus, no longer analyzed because this feature is commonly present and would not distinguish the quality of the training frame relative to the remaining ones.

Once trained, the neural network is available for use. In an example, frames that form a scene need not be sub-sampled (as in the training). Instead, the frames are input to the neural network. In turn, the neural network assesses the quality of each frame. The frame having the best quality can be identified and selected. Hence, if the frames are from a short video, the selected frame can be set as a thumbnail image of the video. If the frames are from an image burst, the selected frame can be stored and the remaining frames can be discarded.

Hence, the overall accuracy and computational efficiency of training and using a neural network for frame selection are improved. The use of loss function that varies based on actual quality differences between training frames, the use of heatmaps and facial quality scores, and the use of feature means significantly improve the accuracy performance. The use of a limited set of training data (e.g., less than twenty training frames and twenty training pairs per training scene) significantly reduces the computational burden. Relative to the Chang neural network, a higher accuracy is achieved at a fraction of the computational burden.

FIG. 1 illustrates examples of using a neural network for frame selection, according to certain embodiments of the present disclosure. As illustrated, a computing device 100 hosts a neural network 110 and a number of frame-related applications 120-130 that rely on the neural network for a frame selection. The neural network 110 is trained to analyze the qualities of received frames. Example architectures of the neural network 110 are further described in FIGS. 3-5 and examples of training the neural network 110 are described in FIGS. 6-11.

In an example, an end user operated the computing device 100 to capture images by using an image application 120 and to access video by using a video application 130. The computing device may be any suitable end user device such as a desktop, a laptop, a tablet, a smartphone, or a wearable device.

The image application 120 interfaces with a camera (not shown) of the computing device 110 or with a remote camera and provides the functionality of an image burst 122. An image burst 122 represents a collection of successive images captured in a short time frame (e.g., twenty images in a second). The image burst 122 is input to the neural network 110. In response, the image application 120 receives an indication 124 of the image 126 having the best quality. For example, the image application 120 receives a ranking of the images, where the neural network 110 ranks the images given their corresponding qualities. In this case, the indication 124 identifies each image (e.g., based on a name or some unique identifier) and its relative ranking. In another example, the image application 120 receives the qualities (e.g., the indication 124 includes the qualities), performs the ranking, and selects the best quality image 126. Rather than storing all the images in the image burst 122, the image application 120 may only store the best quality image 126 in non-cache memory (not shown) of the computing device 110. In this way, the image application 120 reduces the memory space associated with storing images captured by the image application 120.

The video application 130 generates a short video 132 by using the camera or accesses such video 132 from a remote storage location (e.g., from a server). The "shortness" of the video 132 may be defined relative to time or to the number of video frames. Generally, a video is considered short if it is for a same scene. Hence, a few second video or a video of less than a hundred frames long can be generally considered as a short video. Here also, the short video 132 is input to the neural network 110. In response, the video application 130 receives an indication 134 of the video frame having the best quality. For example, the video application 130 receives a ranking of the video frames, where the neural network 110 ranks the video frames given their corresponding qualities. In this case, the indication 134 identifies each video frame (e.g., based on a name or some unique identifier) and its relative ranking. In another example, the video application 130 receives the qualities (e.g., the indication 134 includes the qualities), performs the ranking, and selects the best quality video frame. The video application 130 sets the selected video frame as a thumbnail image 136 that represents the short video 132.

In FIG. 1, the images from the image burst 122 and the video frames from the short video 132 are examples of a frame. The embodiments of the present disclosure are not limited to images and video frames, but similarly apply to any type of frame available from a collection of frames. A frame generally represents an electronic visual representation that depicts physical or virtual objects. A collection of frames represents a set of multiple frames, where these frames may, but need not, be ordered in a particular sequence.

Furthermore, although FIG. 1 illustrates both applications 120 and 130 using the same neural network 110, the embodiments of the present disclosure are not limited as such. Instead, each application 120 or 130 may have its own dedicated neural network. Further, and as illustrated in connection with FIG. 2, the neural network 110 need not be hosted on the computing device 100. Instead, a server may host such a network and provide access thereto to the computing device 100. In this way, the image burst 122 or the short video 132 can be sent from the computing device 100 to the server and the indications 124 and 134 can be received back.

Figure 2:
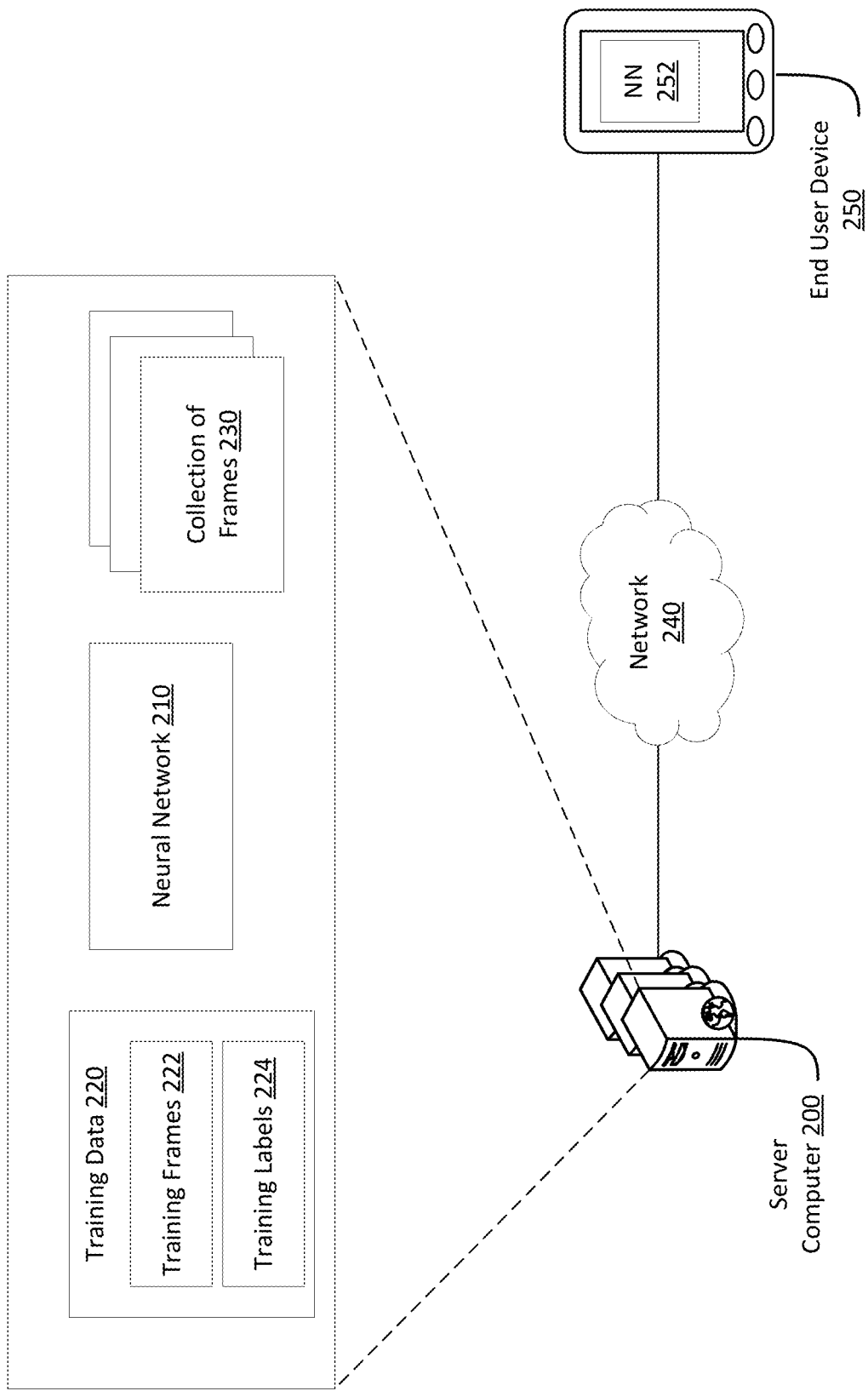
FIG. 2 illustrates an example computer system for performing frame selection by training and using a neural network, according to certain embodiments of the present disclosure.

FIG. 2 illustrates an example computer system for performing frame selection by training and using a neural network, according to certain embodiments of the present disclosure. As illustrated, the computer system includes a server computer 200 and an end user device 250. Generally, the server computer 200 is operated to train the neural network 210. Once trained, the neural network 210 is available for use by the end user device 250 in support of different frame-related applications hosted on the end user device 250.

In an example, the server computer 200 stores training data 220. This data 220 includes training frames 222 and training labels 224. A training frame represents a frame from a collection of frames available for training the neural network 210. Generally, the quality of the training frame is assessed. In an example, the assessment considers the visual quality of the frame and how well the training frame represents the collection of frames. A training label is associated with a training frame and indicates the quality of the training frame. For example, the training label is a quality score (e.g., between "1" and "3," where "3" indicates that the training frame best represents the frame collection and has a high visual quality, while "1" indicates that the training frame does not represent the video and has a low quality). The training label can be associated with the training frame by storing it in metadata of the training frame, for instance. The process of generating the training frames 222 and training labels 224 is further illustrated in FIG. 7. Based on the training data 220, the server computer 200 trains the neural network 210. Example flows for training the neural network 210 are described in connection with FIGS. 8-11.

In addition, the server computer 200 stores multiple collections of frames 230. In an example, a collection of frames represents a short video available for downloading to the end user device 250. In this example, when an end user operated the end user device to search for or browses the short video, a graphical object is presented on a user interface of the end user device 250 to show the short video. The neural network 210 is usable to select the best frame from the short video and the best frame is set as the thumbnail image in the graphical object.

The end user device 250 can communicate with the server computer 200 over a data network 240, such as one involving the Internet. Once trained, the neural network 210 can be downloaded to the end user device 250 (shown as an instance 252 of the neural network 210 on the end user device 250 in FIG. 2) from the computer server 200. Updates to the neural network 210 can also be pushed or sent using a pull mechanism from the server computer 200 to the end user device 250. Additionally or alternatively, the end user device 250 need not download the neural network 210. Instead, when a frame selection should be performed on the end user device 250, a call (e.g. an application programming interface (API) call) is sent over the network 240 to server computer 200 and a response is received back over the network 240.

Figure 3:
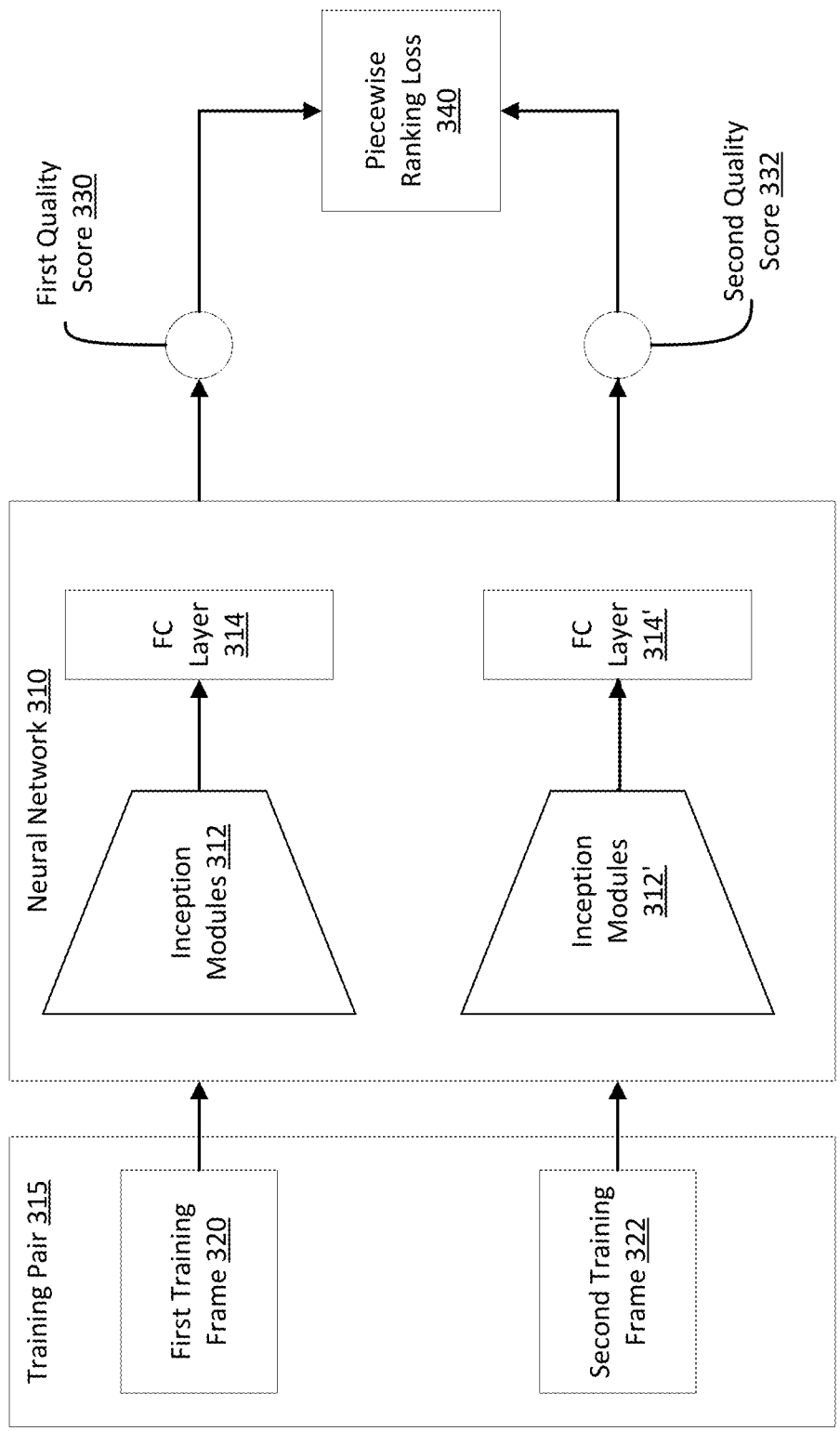
FIG. 3 illustrates an example of a neural network architecture, according to certain embodiments of the present disclosure.

FIG. 3 illustrates an example of a neural network architecture, according with certain embodiments of the present disclosure. In an example, a neural network 310 is trained using training pairs, where each training pair includes two training frames from a same collection of frames. The neural network 310 generates qualities scores, one for each training frame in a training pair. Two quality score generated from a training pair are usable to update the parameters of the neural network 310 during the training.

As illustrated, the neural network 310 is a Siamese neural network. Generally, Siamese neural network are a class of neural network architectures that contain two or more identical subnetworks. Identical refers to the subnetworks having the same configuration with the same parameters and weights. Parameter updating is mirrored across both subnetworks during the training.

A first subnetwork includes a hierarchy of inception modules 312 (e.g., five of such modules) followed by a fully connected network 314. In an example, this subnetwork follows the GoogLeNet architecture describe in "going deeper with convolution," authored by Szegedy, C.; Liu, W.; Jia, Y.; Sermanet, P.; Reed, S.; Anguelov, D.; Erhand, D. in Proceedings of the IEEE Conference on Computer Vision and Pattern Recognition, pages 1-9 (2015), the content of which is incorporated herein by reference. A second subnetwork mirrors it and includes the same number of inception modules 312' followed by a fully connected layer 314'.

The training of the neural network 310 includes iteratively inputting training pairs to the neural network 310 and updating parameters of the neural network 310 (e.g., the weights of the connections between the nodes of this network 310) based on a loss function. In an example, the loss function is defined as a piecewise ranking loss 340.

A training pair 315 includes two elements: a first training frame 320 and a second training frame 322. The two frames 320 and 322 belong to a same collection of frames (e.g., to the same short video and, thus, show the same scene). Each of the training frames 320 and 322 is associated with a separate training label. An actual quality difference is computed from the training labels of the training frames 320 and 322. For example, when these labels include quality scores, the actual quality difference is the subtraction of the quality score of the second training frame 322 from that of the first training frame 320. The actual quality difference represents a ground truth about the quality of the training pair 315.

The first subnetwork receives the first training frame 320 and generates a first quality score 330. Similarly, the second subnetwork receives the second training frame 322 and generates a second quality score 332. The difference between the two scores 330 and 332 represents an estimated quality difference. The estimated quality difference and the ground truth (e.g., the estimated quality difference) are used to compute the piecewise ranking loss 340. The parameters of the neural network 310 (e.g., the various weights) are updated (e.g., through backpropagation) based on the processing of various training pairs such that the piecewise ranking loss 340 is minimized.

In an example, the definition (e.g., the formula or equation) of the piecewise ranking loss 340 varies depending on the ground truth. For instance, multiple thresholds are defined based on the training labels. If the ground truth is smaller than a first threshold, a first equation for the piecewise ranking loss 340 is defined. Being smaller than the first threshold indicates that the two training frames have a similar quality. If the ground truth is between the first threshold and a second threshold, a second equation for the piecewise ranking loss 340 is defined. If the ground truth is larger than the second threshold, a third equation for the piecewise ranking loss 340 is defined. Being larger than the second threshold indicates that the two training frames have very different qualities.

In an illustrative example, the piecewise ranking loss 340 is defined as $$PR = \begin{cases} \frac{1}{2}\max(0, |D_p| - m_s)^2 & \text{if } D_g < m_s \\ \frac{1}{2}\{\max(0, m_s - D_p)^2 + \max(0, D_p - m_d)^2\} & \text{if } m_s \leq D_g \leq m_d \\ \frac{1}{2}\max(0, |m_d - D_p|)^2 & \text{if } D_g > m_d \end{cases}$$

where PR represents the piecewise ranking loss 340, $D_g = G(I_1) - G(I_2)$ (e.g., the ground truth computed by subtracting the quality score $G(I_2)$ of the second training frame $I_2$ from the quality score $G(I_1)$ of the first training frame $I_1$, where the quality scores $G(I_i)$ are indicated in the training labels), and $D_p = P(I_1) - P(I_2)$ (e.g., the estimated quality difference computed by subtracting the generated second quality score 332 $P(I_2)$ of the second training frame $I_2$ from the generated first quality score 330 $P(I_1)$ of the first training frame $I_1$, where the quality scores $P(I_i)$ are generated by the neural network 310. $m_s$ and $m_d$ are the first threshold and the second threshold and, in an example, set as constants based on heuristics (e.g., set to "0.03" and "0.1" for quality scores between "1" and "3").

The use of such piecewise ranking loss 340 provides an error signal not only for the training frames with different quality scores, but also for the training frames with the same rating (e.g., having comparable quality). The piecewise ranking loss 340 also introduces relaxation in the ground truth score, which make the neural network 310 more stable, especially for the case where the ratings are subjective (e.g., when the training labels are manually defined by expert reviewers). Once trained, the neural network 310 generates a quality score for a frame input thereto. Generally, the higher the score, the more representative of a frame collection and the better visual quality the frame is. Accordingly, the scores allows ranking the different frames of the collection frame by inputting these frames to the neural network 310. The best frame can be selected as the one having the highest score.

Figure 4:
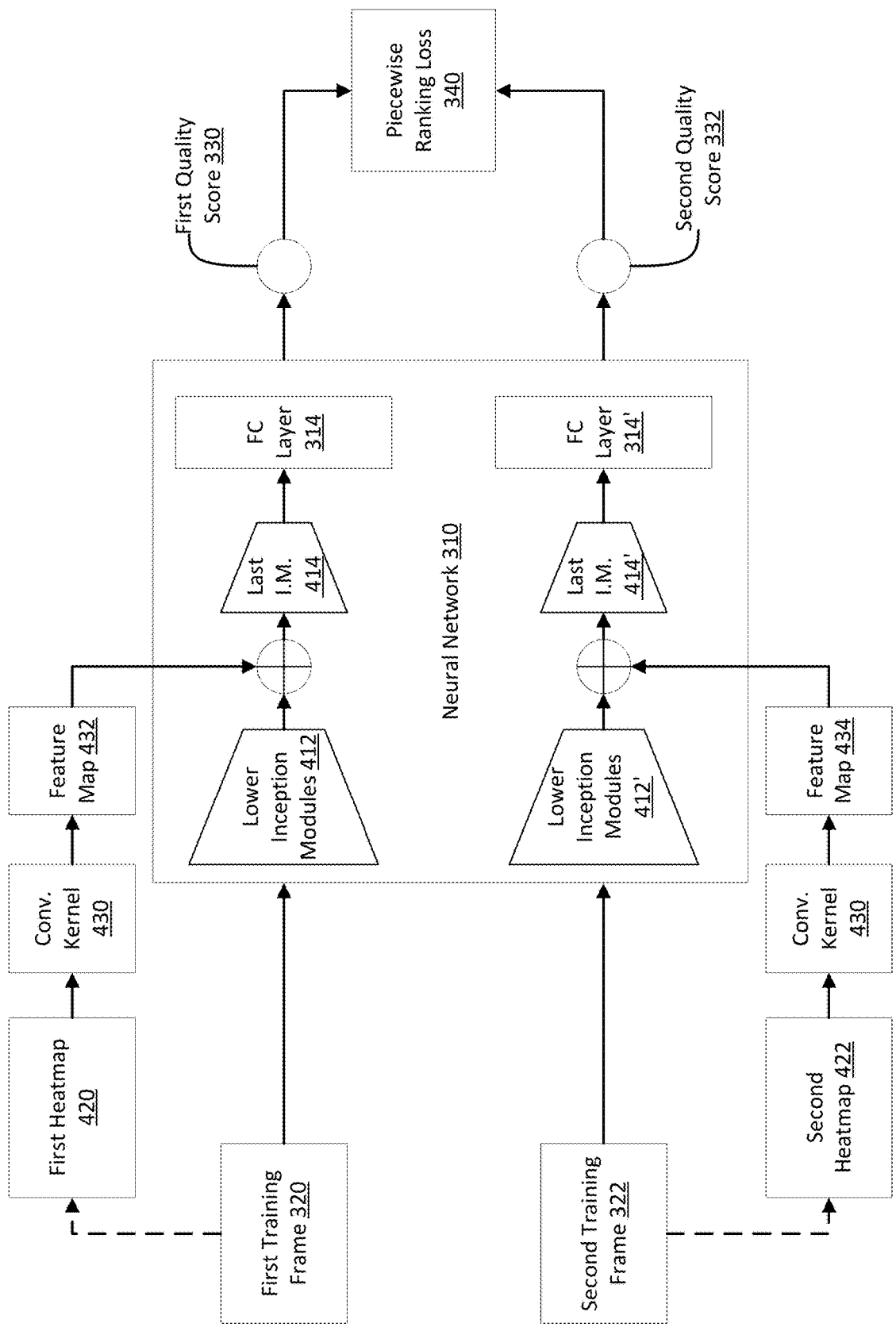
FIG. 4 illustrates an example of a neural network architecture that incorporates a facial heatmap according with certain embodiments of the present disclosure.

FIG. 4 illustrates an example of a neural network architecture that incorporates a facial heatmap, according with certain embodiments of the present disclosure. In an example, the neural network includes the neural network 310 of FIG. 3 and a convolutional kernel 430. The convolutional kernel 430 is used to generate a feature map from a facial heatmap, where the feature map includes features relevant to possible faces recognized in the heat map. The feature map is input to the hidden layers of the neural network 310. In this way, during the training of the neural network 310, facial features (as available from feature maps) become part of the features learned by the neural network 310.

As illustrated, a first heatmap 420 is generated from a first training frame 320 in a training pair and indicates the size and location of faces, if any, in the training frame 320. A second heatmap 422 is similarly generated from a second training frame 322 in the training pair. Each of the heatmaps 420 and 422 is input to the convolutional kernel 430. In an example, the convolutional kernel 430 is a convolutional layer with a kernel size of 1×1. The convolutional kernel 430 outputs a feature map 432 from the first heatmap 420 and a feature map 434 from the second heatmap 422. Each of the feature maps 432 and 434 includes features (e.g., a 384×7×7 feature map) representative of the respective heatmap 420 or 422.

The feature map 432 is input to the first subnetwork of the neural network 310. As explained herein above in connection with FIG. 3, the first subnetwork includes a hierarchy of five (or some other number) inception modules. The feature map 432 is input to the last inception module 414 in the hierarchy (e.g., the fifth one). In this way, the weights of the lower inception modules 412 (e.g., the first four inception modules) are updated as explained in connection with the training of the neural network 310 in FIG. 3. The heatmap 422 is used to train the last inception module 414 and the fully connected layer 314 using the loss function. Similarly, the second feature map 434 is input to the second subnetwork of the neural network 310 (e.g., as input to the last inception module 414' and not the first four inception modules 412') and is used to train the last inception module 414' and the fully connected layer 314'.

Figure 5:
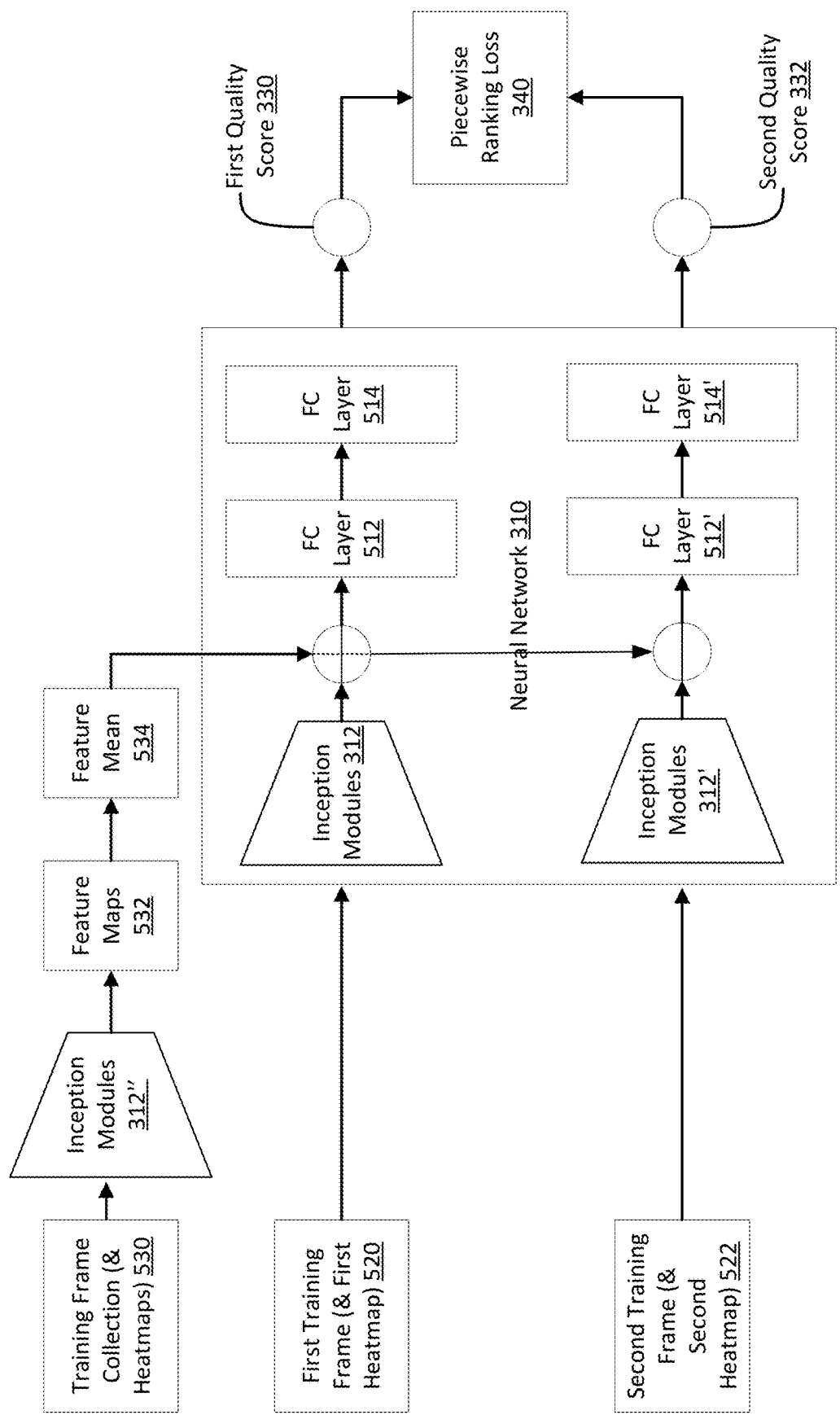
FIG. 5 illustrates an example of a neural network architecture that incorporates a feature, according with certain embodiments of the present disclosure.

FIG. 5 illustrates an example of a neural network architecture that incorporates a feature mean, in according with certain embodiments of the present disclosure. In an example, frames from a frame collection typically share similar semantic content. However, the difference among the frames or the overall context is typically an indicator of the best frame. To find such difference, the feature mean can be incorporated in the neural network 310. Although FIG. 5 is described in connection with using heatmaps (the heatmap use is described in connection with FIG. 4), the feature mean can be used independently thereof (e.g., in connection with training images and absent of heat maps, as described in FIG. 3). The use of parentheses in FIG. 5 indicates the optional use of the heatmaps.

In an example, a training frame collection 230 includes a particular number of training frames (e.g., nineteen of them). Each of these training frames may also be associated with a heatmap. Each training frame and, optionally, each associated heatmap are input to the neural network 310, such as to the inception modules 312" (e.g., to the lowest inception module) of this network. The neural network 310 (e.g., inception modules 312") may have weights set-up based on the training as described in connection with FIGS. 3 and 4. A feature map for each training frame is an output from the neural network 310 (e.g., from the last inception module) and represents vectors of features extracted from the training image (and, optionally, the associated heatmap). Hence, the particular number (e.g., nineteen) of feature maps 532 is generated. A feature mean 534 is generated from the feature maps by, for example, averaging the vectors. This feature mean 534 represents the average feature vector of the training frame collection 530.

The feature mean 534 is used to further train the neural network 310. In particular two fully connected layers are added to the neural network and are trained based on the feature mean 534. These two fully connected layers are shown with elements 512 and 514 in the first subnetwork and elements 512' and 514' in the second subnetwork of the neural network 310. In an example, training the two fully connected layers includes subtracting the average mean 534 from each training image in a training pair that is input to the neural network 310 and using the piecewise ranking loss 340.

As illustrated, a first training image 520 and a second training image 522 from the training frame collection 530 form a training pair. The training pair is input to the neural network 310. Optionally, heatmaps are also generated from each of the training images 520 and 522 and are inputs to the neural network 310. Feature mean 534 is subtracted from the features of the first training frame 520 (and, optionally, its associated heatmap) and from the features of the second training frame 520 (and, optionally, its associated heatmap. The subtraction operations are shown in FIG. 5 between the relevant inception modules 312 or 312' and the first fully connected layer 512 or 512').

FIGS. 6-11 illustrate example flows for training and using a neural network in connection with frame selection. A computer system hosting the neural network, such as one including the computer server 200 and the end user device 250 of FIG. 2, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

In the interest of clarity of explanation, some of the example flows or operations thereof are described in connection with a training pair that includes a first training frame and a second training frame from a frame collection about a scene. However, the example flows and operations are similarly applied to other training pairs from the frame collection and from other training collections. More specifically, multiple training pairs are similarly generated and the training is repeated using these pairs to update the parameters (e.g., the weights) of the neural network.

Figure 6:
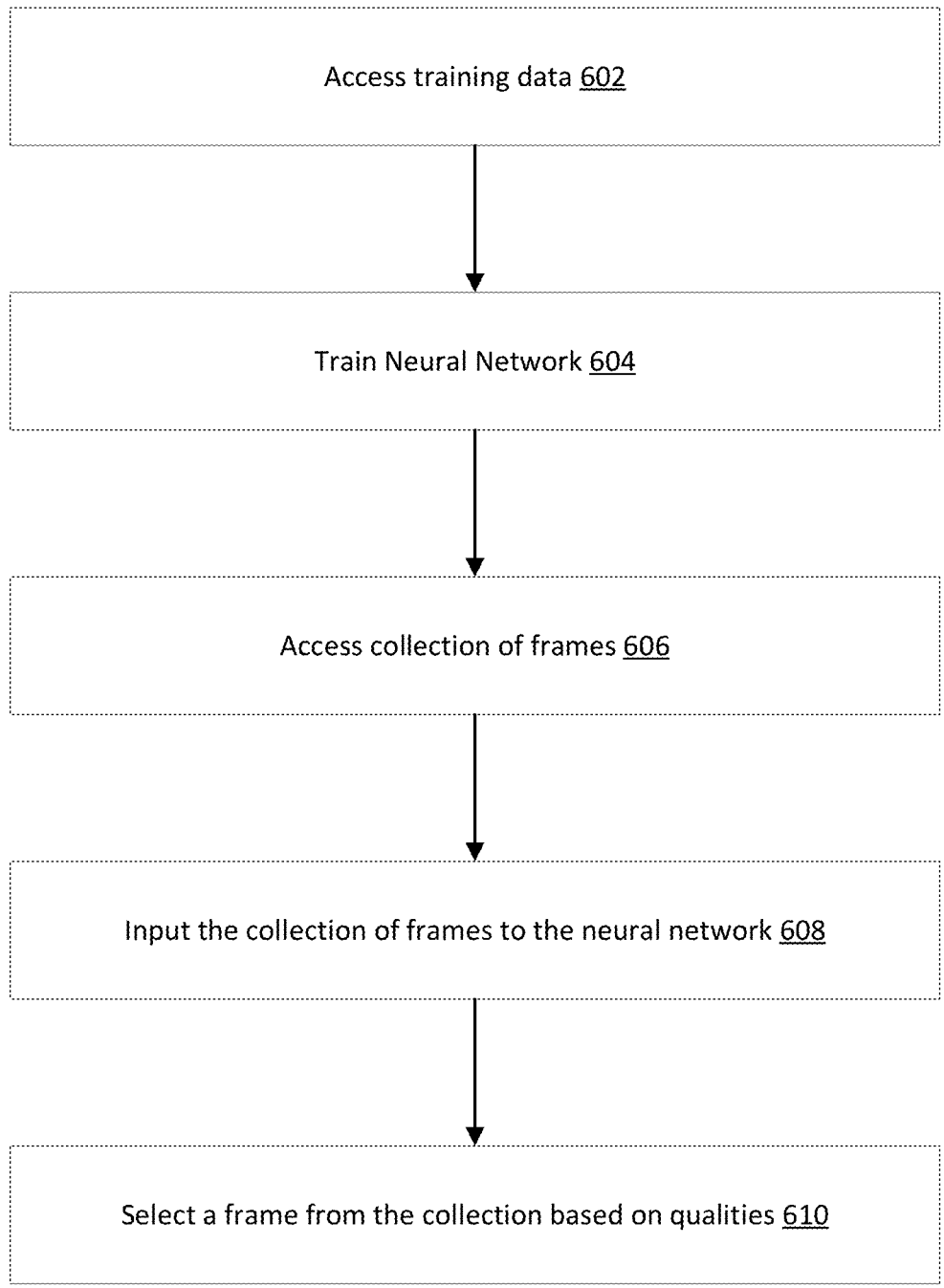
FIG. 6 illustrates an example of an overall flow for training and using a neural network in connection with frame selection, according with certain embodiments of the present disclosure.
Figure 7:
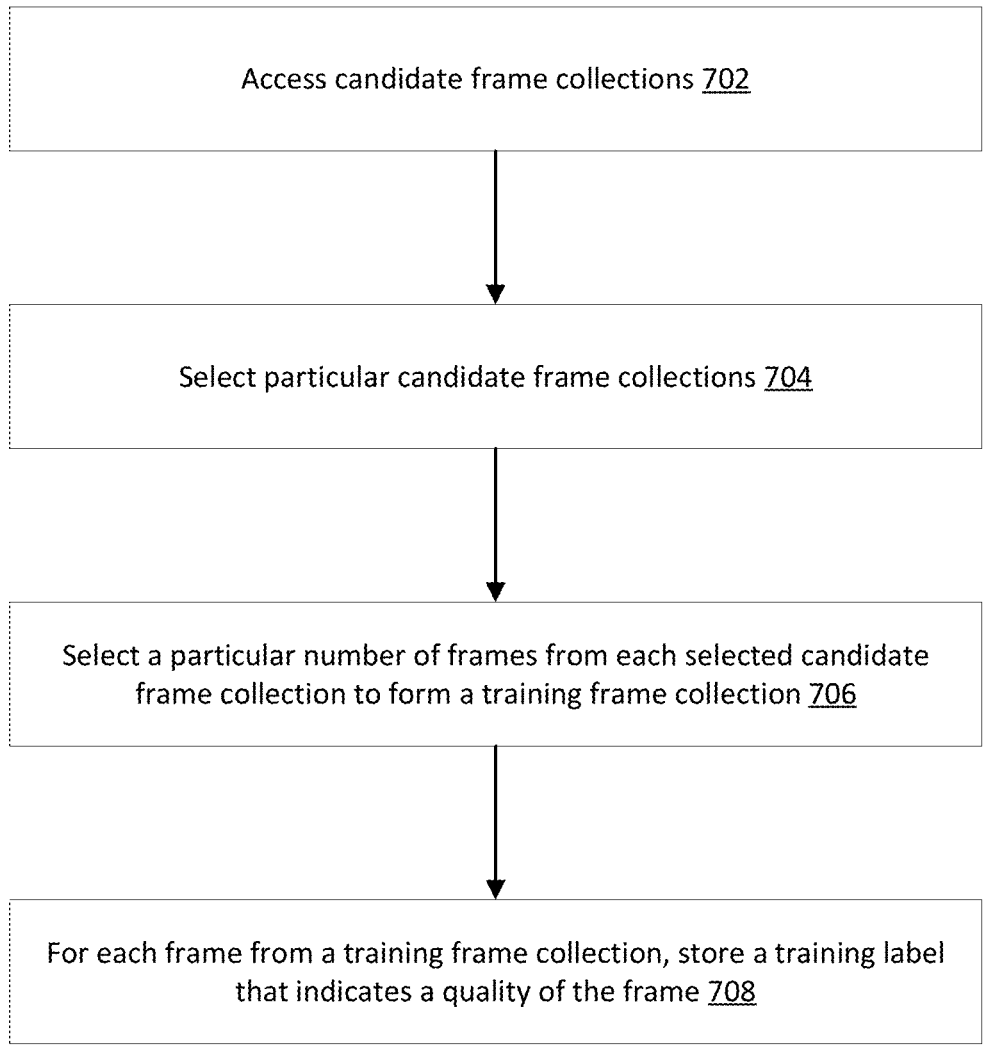
FIG. 7 illustrates an example of a flow for generating training data, according with certain embodiments of the present disclosure.

FIG. 6 illustrates an example of an overall flow for training and using the neural network in connection with frame selection, according with certain embodiments of the present disclosure. The example flow starts at operation 602, where the computer system accesses training data. In an example, the training data includes training frames and training labels. The training frames are associated with a same scene. Each training label is associated with a training frame of the training frames and indicates a quality of the training frame (e.g., the visual quality and how well does the training frame represent the training frame collection). FIG. 7 further illustrates a process for generating the training data. This training data can be stored in memory local to the computer system or remotely accessible over a data network.

At operation 604, the computer system trains the neural network. In an example, the training includes generating a training pair that includes a first training frame and a second training frame from the training frames and using an estimated quality difference and an actual quality difference between the two training frames to update the parameters of the neural network. The parameters are updated by using a piecewise ranking loss. This training is further described in connection with FIG. 8. In a further example, the training also includes using a heatmap for each of the training frames in the training pair and using facial quality to update the piecewise ranking loss. This additional is further described in connection with FIGS. 9 and 10. In yet another example, the training further includes using a feature mean. This feature mean is subtracted from the feature map of each of the training frames in the training pair. This training is further described in connection with FIG. 11.

At operation 606, the computer system accesses a collection of frames. In an example, the collection of frames is an image burst captured by an image application hosted on an end user device of the computer system. In this example, once the training is complete, the neural network can be downloaded to the end user device. Accordingly, the collection of frames is accessed from local memory of the end user device. Alternatively, the neural network need not be downloaded to the end user device. Instead, the collection of frames may be received from the end user device (e.g., received by a server computer that hosts the neural network). In another example, the collection of frames is a short video available from storage local or remote to the end user device. the short video is accessed from this storage.

At operation 608, the computer system inputs the collection of frames to the neural network. In an example and unlike the training, the collection of frames is not sub-sampled. Instead, each of the frames is an input to the neural network. In turn, the neural network generates a quality (e.g., a quality score) of each input frame.

At operation 610, the computer system selects a frame from the collection of frames based on the qualities generated by the neural network. In an example, the neural network outputs the qualities (e.g., the quality scores) to a frame-related application of the computer system (e.g., such as to an image application of a video application hosted on the end user device). In turn, the frame-related application selects the frame having the best quality (e.g., the highest score). In another example, the neural network ranks the frames and outputs the ranking to the frame-related application. The application then compares the ranks and selects the highest ranked frame. In yet another example, the neural network ranks the frames and merely outputs an identifier of the highest ranked frame. The application then selects this frame.

FIG. 7 illustrates an example of a flow for generating training data, according with certain embodiments of the present disclosure. The example flow starts at operation 702, where the computer system accesses candidate frame collections. In an example, these collections are stock collections available from storage. For instance, a hundred thousand or more short videos and/or image bursts may be available from the storage, each associated with a daily scene (e.g., people walking in a park, family gathered around a dining table, a dog chasing a duck in a park, etc.). Each candidate frame collection is associated with metadata describing content and/or objects of the scene represented in the training frames of the collection.

At operation 704, the computer system selects particular candidate frame collections from the candidate frame collections. In an example, a positive keyword list is used to filter the candidate frame collections and a negative keyword list is used to block the inappropriate ones. The positive keyword list includes keywords that connote a positive value such as family, kid, boy, girl, man, woman, pet, travel, vacation, holiday, and the like. The negative keyword list includes keywords that connote a negative value such as ski, bacteria, lens flare, and the like. The filtering is applied to select the particular candidates collections that meet three criteria: first, including at least one keyword from the positive keyword list; second, not including any keyword from the negative keyword list; and third, the training collection is short (e.g., no longer than 10 seconds or 100 frames). In an illustration, 11,000 particular candidate frame collections are selected from one hundred thousand frame collections.

At operation 706, the computer system selects a particular number of frames from each selected particular candidate frame collection. The selected frames from a candidate form a training frame collection usable to train the neural network. In an example, nineteen (or some other number) frames are extracted from the selected candidate frame collection by uniformly sampling this candidate (e.g., at an eight per second sample rate). In an illustration, 11,000 training frame collections are generated, each corresponding to one of the 11,000 particular candidate frame collections and including nineteen frames.

At operation 708, the computer system stores a training label for each frame from a training frame collection. The training label indicates the quality of the relevant frame. In an example, each training label includes a quality score and is stored as metadata about the relevant frame. The quality scores can be generated by outputting each training frame collection to a computing devices of a number of expert reviewers and by receiving the quality scores back from the computing devices. If multiple quality scores are received back for a frame, its training label is set as an average of these quality scores. Further, the quality scores of frames in a training frame collection can be normalized.

Figure 8:
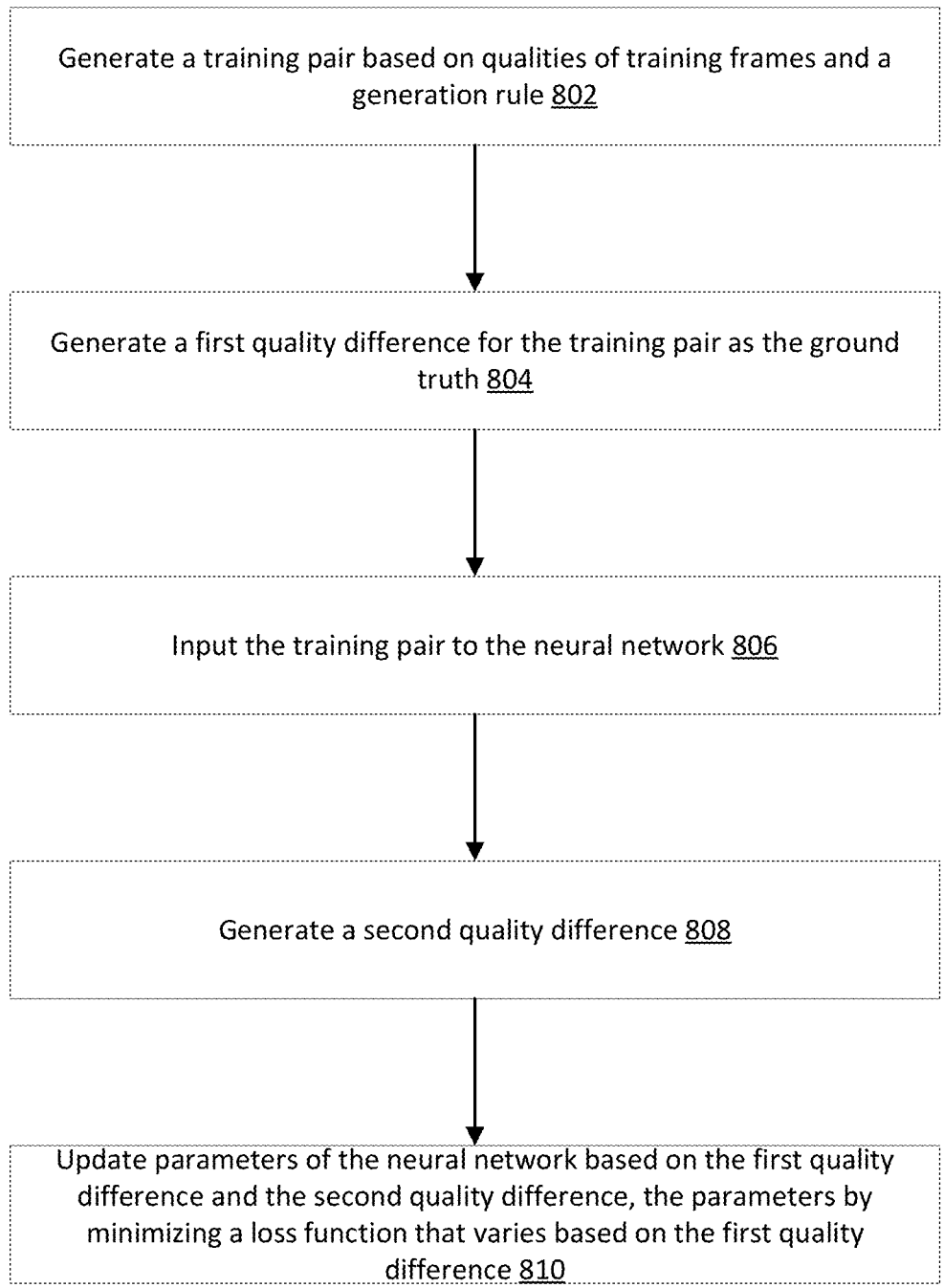
FIG. 8 illustrates an example of a flow for training a neural network with a loss function that has a variable definition based on a quality difference between training frames in a training pair, according to embodiments of the present disclosure.

FIG. 8 illustrates an example of a flow for training the neural network with a loss function that has a variable definition based on a quality difference between training frames in a training pair, according to embodiments of the present disclosure. The example flow starts at operation 802, where the computer system generates a training pair based on qualities of training frames and a generation rule. In an example, the generation rule specifies that a particular number of training pairs should be generated from each training frame collection. In an illustration, this particular number can be equal to the total number of training frames in the training collection minus one (e.g., eighteen training pairs from a collection having nineteen frames). Further, the generation rule specifies that the first element of a training pair has to have a higher quality than the second element. The generation rule can also or alternatively specify that the training frame having the best quality from the training frame collection is always set as the first element in all of the training pair generated from the training frames of the training frame collection.

At operation 804, the computer system generates a first quality difference between the first training frame and the second training frame in the training pair based on a comparison of a first training label and a second training label. In an example, the first training label is associated with the first training frame and includes a first quality score of the first training frame. The second training label is associated with the second training frame and includes a second quality score of the second training frame. The first quality difference is the difference between these two scores, represents an actual quality difference, and is set as the ground truth.

At operation 806, the computer system inputs the training pair to the neural network. In response, the neural network estimates, based on its parameters, two qualities, one for each of the training frames in the training pair. In an example, the qualities are quality scores.

At operation 808, the computer system generates a second quality difference. In an example, this second quality difference is a difference between the quality score generated by the neural network for the first training frame in the training pair and the quality score generated by the neural network for the second training frame in the training pair. The computer system can receive the quality scores from the neural network and compute the second quality difference. Alternatively, the neural network generates this quality difference and the computer system receives it.

At operation 810, the computer system updates parameters of the neural network by at least minimizing a loss function of the neural network based on the first quality difference and the second quality difference. In an example, the parameters include weights of connection between nodes of the different layers of the neural network. These parameters can be updated based on backpropagation once the loss is computed. The loss is a piecewise ranking loss, similar to the one described in connection with FIG. 3. More specifically, the loss function has a variable definition based on the first quality difference (e.g., the ground truth).

In an example, the definition of the loss function varies based on a comparison of the first quality difference to a first threshold and a second threshold. The definition uses a difference between the second quality difference and the first threshold based on the comparison indicating that the first quality difference is smaller than the first threshold. The definition uses a difference between the second threshold and the second quality difference based on the comparison indicating that the first quality difference is larger than the second threshold. The definition uses a first difference between the first threshold and the second quality difference and a second difference between the second quality difference and the second threshold based on the comparison indicating that the first quality difference is between the first threshold and the second threshold.

Figure 9:
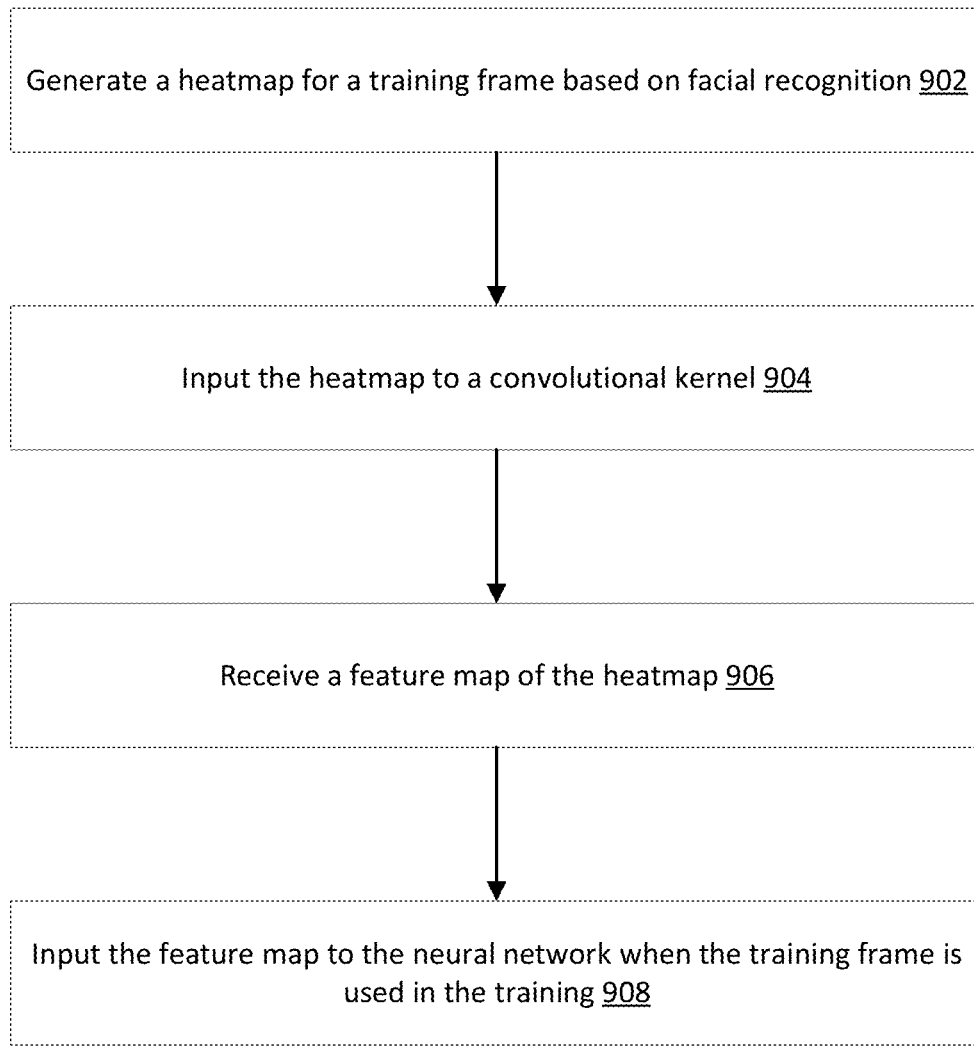
FIG. 9 illustrates an example of a flow for training the neural network with a feature map generated based on a heatmap, according to embodiments of the present disclosure.

FIG. 9 illustrates an example of a flow for training the neural network with a feature map generated based on a heatmap, according to embodiments of the present disclosure. The example flow starts at operation 902, where the computer system generates a heatmap for a training frame based on facial recognition. In an example, the computer system applies a facial recognition algorithm to the training frame to detect the presence, if any, of each face in the training frame and to generate a boundary box around the face. For instance, the facial recognition algorithm is implemented as a facial recognition convolutional network such as the one described in "a convolutional neural network cascade for face detection," authored by Li, H.; Lin, Z.; Shen, X.; Brandt, J.; and Hua, G. in Proceedings of the IEEE Conference on Computer Vision and Pattern Recognition, 5325-5334 (2015), the content of which is incorporated herein by reference. The center of the boundary box is set to a predefined maximum value (e.g., 256) and that value decays linearly or exponentially away from the center and toward the boundary. At the boundary, the value is set to a minimum (e.g., a zero). Hence, the heatmap represents each pixel of the training frame with the minimum value if the pixel is outside of the boundary box and with a value between the minimum and the predefined maximum if the pixel is within the boundary box.

At operation 904, the computer system inputs the heatmap to a convolutional kernel. In an example, the convolutional kernel is a convolutional layer with a kernel size of 1×1 and outputs a feature map from the heatmap. The feature map represents a feature vector, such as a 384×7×7 feature vector, of the different features extracted by the convolutional kernel from the heatmap.

At operation 906, the computer system receives the feature map of the heatmap. In an example, the feature map is received as the output from the convolutional kernel in response to inputting the heatmap.

At operation 908, the computer system inputs the feature map to the neural network when the training frame is used in the training of the neural network. In an example, the training frame is an element of a training pair and is input to one of the subnetworks of the neural network (e.g., in a Siamese convolutional neural network implementation). Hence, upon inputting the training frame to the relevant subnetwork, the computer system also inputs the feature map of the heatmap to the last inception module in the subnetwork. In this way, the features extracted from the heatmap are added to the features extracted from the training frame and become part of the training.

Figure 10:
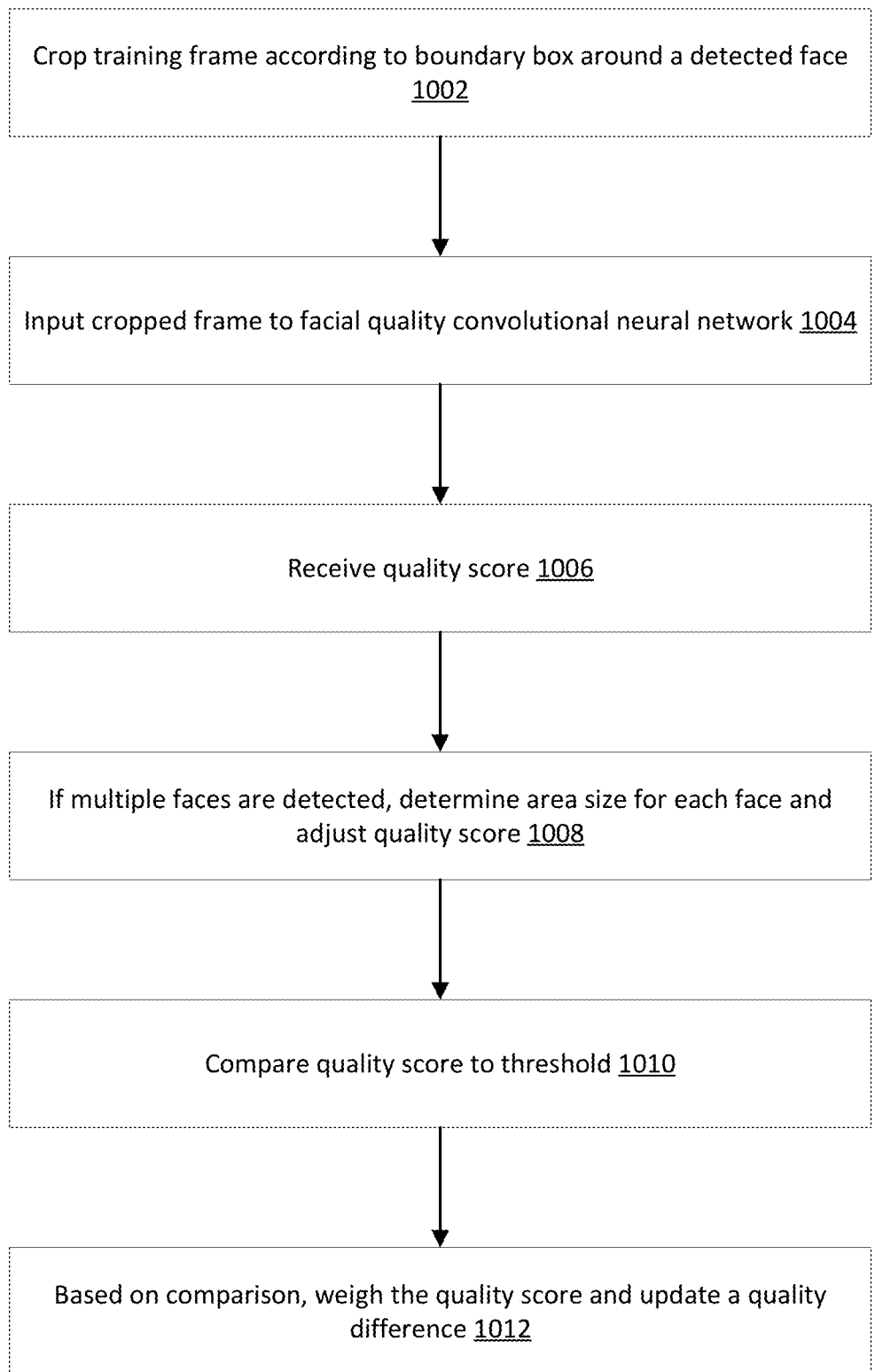
FIG. 10 illustrates an example of a flow for training the neural network based on incorporating facial quality, according to embodiments of the present disclosure.

FIG. 10 illustrates an example of a flow for training the neural network based on incorporating facial quality, according to embodiments of the present disclosure. The example flow starts at operation 1002, where the computer system crops a training frame according to a boundary box around a detected face. For example, the computer system applies a facial recognition algorithm, as described in connection with operation 902 of FIG. 9, to generate the boundary box and crops the training frame to the boundary box. The cropped training frame represents a cropped frame generated from the training frame based on a recognition of the face present in the training frame, where the cropped frame includes the face.

At operation 1004, the computer system inputs the cropped frame to a facial quality convolutional neural network. In an example, the facial quality convolutional neural network is a separate network that has already been trained to assess the qualities of faces present in frames. The training of this facial quality convolutional neural network relies on manually annotated faces with scores set as "0," "0.5," and "1." The higher the score, the better the quality of a face. The architecture of the facial quality convolutional neural network follows the SqueezeNet architecture described in "Squeeznet: Alexnet-level accuracy with 50× fewer parameters and 0.5 mb model size," authored by Iandola, F. N.; Han, S.; Moskewicz, M. W.; Ahsraf, K.; Dally, W. J.; and Keutzer, K. in arXiv preprint arXiv: 1602.07360 (2016), the content of which is incorporated herein by reference. The loss function of this network is set as a Euclidean loss. In response to the cropped frame being an input, the facial quality convolutional neural network outputs an indicator of the quality of the face around which the crop was performed. The indicator can be a quality score of the face in the cropped frame.

At operation 1006, the computer system receives the quality score. Accordingly, the computer system determines the quality score of the face based on inputting the cropped frame to the facial quality convolutional neural network that trained for generating the quality score. This quality score is set as a quality score of the training image.

At operation 1008, if multiple faces are detected in the training image (e.g., based on the application of the facial recognition algorithm), the computer system determines a size of an area that each face occupies in the training frame and adjusts the quality score of the training frame. In an example, the application of the facial recognition algorithm detects multiple faces and generates multiple boundary boxes, one per face. The area size of each face is computed as the area size of the corresponding boundary box. Further, the computer system generates multiple cropped frames from the training frame, where each cropped frame is generated by cropping the training image to one of the boundary boxes. Each cropped frame is input to the facial quality convolutional network and a respective quality score is received. The computer system adjusts the quality score (e.g., the total score) of the training frame (as determined in operation 1006) by normalizing each of the received quality scores based on the area sizes. For $$P_f = \frac{\sum_{i=1}^{m} A_i \cdot P_i}{\sum_{i=1}^{m} A_i},$$

instance, the quality score of the training frame is set as where "$P_j$" is the quality score of the training frame, "$P_i$" is the quality score of the ith face detected in the training frame, "m" is the number of detected faces in the training frame, and "$A_i$" is the area size of the ith face detected in the training frame.

At operation 1010, the computer system compares the quality score to a threshold. In an example, this comparison allows the computer system to incorporate the quality score into an estimated score generated by the neural network and used in the estimated quality difference. In particular, if the quality score of the training image "$P_f$" is larger than the threshold "$\beta$," the estimated score and estimated quality difference should be updated. Otherwise, no adjustment is needed. In an example, threshold "$\beta$" is set heuristically to a constant value, such as 0.9.

At operation 1012, the computer system weighs the quality score by a predefined weight factor "$\lambda$" and updates the estimated quality difference based on the comparison indicating that the quality score of the training image "$P_j$" is larger than the threshold "$\beta$." In an example, the weight factor "k" is predefined heuristically as a constant value, such as 0.05. As described herein above in connection with the piecewise ranking loss, the training of the neural network includes generating the estimated quality difference "$D_r$," based on an estimated score "$P(I_i)$" of the training frame "$I_i$" when used as an element in a training pair. Hence, the estimated score "$P(I_i)$" and is updated based on the quality score "$P_f$," which in turn results in an update to the estimated quality difference "$D_p$." In an example, the estimated score is updated as $$P(I_i) = \begin{cases} P(I_i) + \lambda \cdot P_f & \text{if } P_f > \beta \\ P(I_i) & \text{if } P_f \leq \beta \end{cases}.$$

Figure 11:
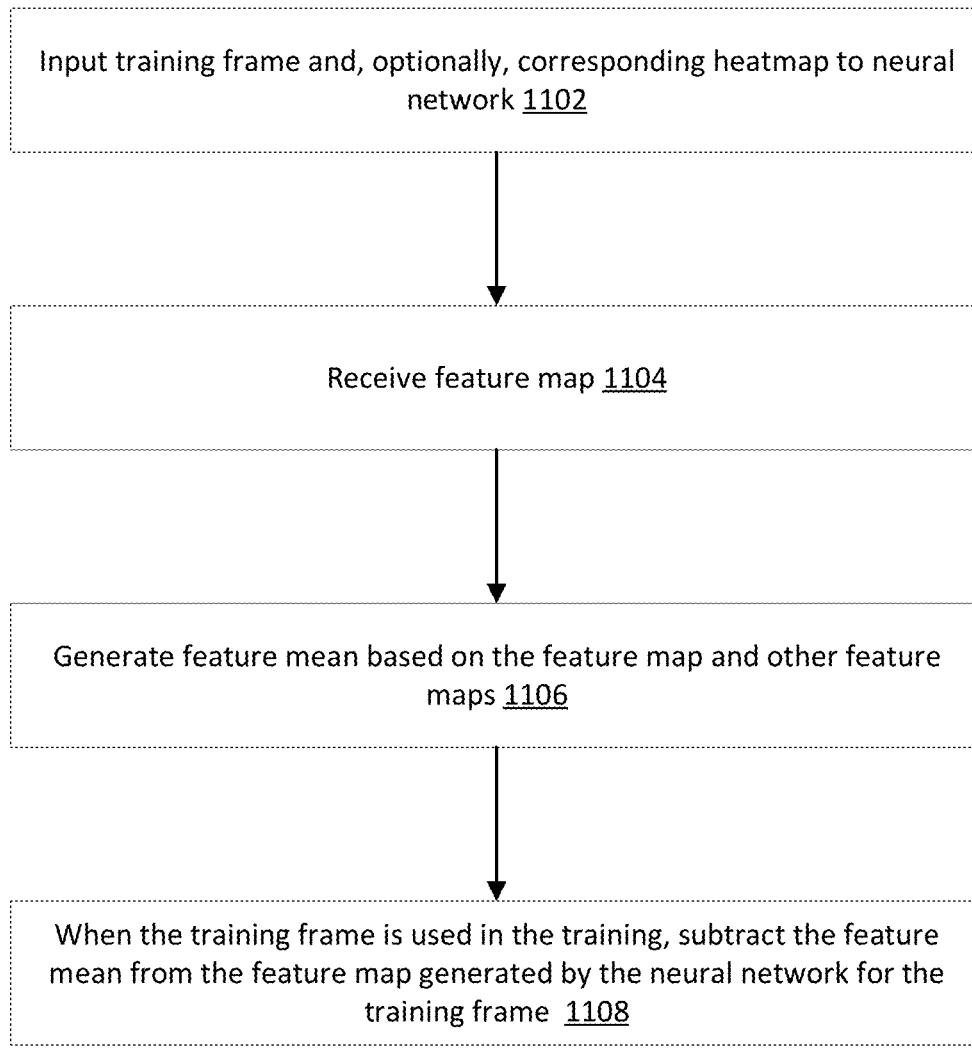
FIG. 11 illustrates an example of a flow for further training the neural network based on incorporating feature mean, according to embodiments of the present disclosure.

FIG. 11 illustrates an example of a flow for further training the neural network based on incorporating feature mean, according to embodiments of the present disclosure. The example flow starts at operation 1102, where the computer system inputs a training frame from a training frame collection and, optionally, a corresponding heatmap to the neural network. In an example, the neural network has already been trained based on training pairs as described in connection with FIG. 8 and, optionally, based on heatmaps and facial qualities as described in connection with FIGS. 9-10.

At operation 1104, the computer system receives a feature map for the training frame and, optionally, the heatmap. In an example, the feature map includes features of the training frame and, optionally, the heatmap, where these features are extracted by the neural network. Operations 1102 and 1104 are repeated for the various training frames (and, optionally, the heatmaps) of the frame collection to generate feature maps, each of which corresponding to one of the training frames (and, optionally, the corresponding heatmap).

At operation 1106, the computer system generates a feature mean based on the feature map of the training frame and the other feature maps of the remaining training frames in the training frame collection. In an example, the feature mean is an average of the different feature maps.

At operation 1108, the computer system subtracts the feature mean from the feature map generated by the neural network for the training frame. In an example, the neural network is further trained based on the feature mean. In this further training, the training frame and, optionally, the corresponding heatmap are input to the neural network. Accordingly, when the training frame and, optionally, the corresponding heatmap are input, the computer system subtracts the feature mean from the features extracted by the neural network for the training frame and, as applicable, the corresponding heatmap.

Figure 12:
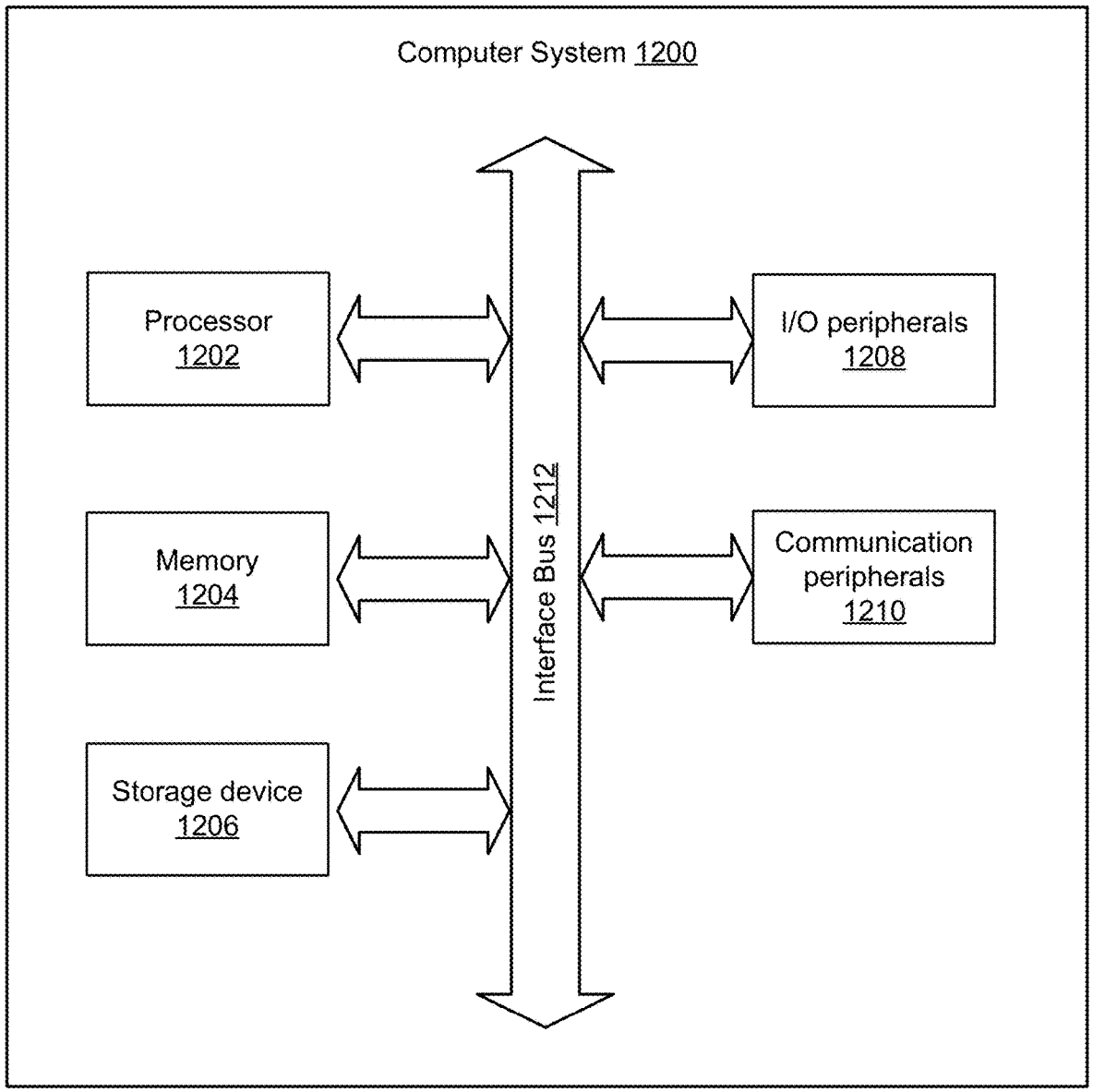
FIG. 12 illustrates examples of components of a computer system 1200 according to certain embodiments.

FIG. 12 illustrates examples of components of a computer system 1200 according to certain embodiments. The computer system 1200 may have a distributed architecture, where some of the components (e.g., memory and processor) are part of an end user device and some other similar components (e.g., memory and processor) are part of a computer server. The computer system 1200 includes at least a processor 1202, a memory 1204, a storage device 1206, input/output peripherals (I/O) 1208, communication peripherals 1210, and an interface bus 1212. The interface bus 1212 is configured to communicate, transmit, and transfer data, controls, and commands among the various components of the computer system 1200. The memory 1204 and the storage device 1206 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1204 and the storage device 1206 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1200.

Further, the memory 1204 includes an operating system, programs, and applications. The processor 1202 is configured to execute the stored instructions and includes, for example, a logical processing unit, a microprocessor, a digital signal processor, and other processors. The memory 1204 and/or the processor 1202 can be virtualized and can be hosted within another computing systems of, for example, a cloud network or a data center. The I/O peripherals 1208 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1208 are connected to the processor 1202 through any of the ports coupled to the interface bus 1212. The communication peripherals 1210 are configured to facilitate communication between the computer system 1200 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method, comprising:
   providing a collection of images to a neural network, the neural network trained using training data comprising training images and associated training labels, wherein a training label associated with a training image indicates a quality measure for the training image, the neural network having associated parameters resulting from minimization of a loss function based on a first quality difference and a second quality difference, wherein the first quality difference is based on a training label associated with a first training image in the training images and a training label associated with a second training image in the training images, and wherein the second quality difference is based on an estimation of quality of the first training image and an estimation of quality of the second training image generated by the neural network;

generating, using the neural network, an estimation of quality for each image in the collection of images; and based upon the estimations of quality generated for the collection of images, selecting and storing a particular image from the collection of images.

2. The computer-implemented method of claim 1, wherein the first training image has a higher quality than the second training image according to the training labels associated with the first and second training images.

3. The computer-implemented method of claim 1, wherein selecting the particular image from the collection of images comprises selecting an image from the collection of images having a highest estimation of quality from among the estimations of quality generated for the collection of images by the neural network.

4. The computer-implemented method of claim 1, wherein the collection of images corresponds to a plurality of successive images captured in a particular time frame.

5. The computer-implemented method of claim 1, wherein the collection of images correspond to images from a video.

6. The computer-implemented method of claim 1, further comprising:

generating a thumbnail image based upon the selected particular image; and outputting the thumbnail image.

7. The computer-implemented method of claim 1, wherein the neural network is further trained by:

generating a heatmap from the first training image based on a recognition of a face present in the first training image;

generating a feature map based on the heatmap; and inputting the feature map to the neural network in association with inputting the first training image and the second training image to the neural network.

8. The computer-implemented method of claim 1, wherein the neural network is further trained by:

generating a feature map for each of the training images based on inputting each of the training images to the neural network;

generating a feature mean based on feature maps of the training images; and subtracting the feature mean from the feature map of the first training image in response to the first training image being an input to the neural network.

9. The computer-implemented method of claim 1, wherein the neural network is further trained by:

generating a cropped image from the first training image based on a recognition of a face present in the first training image, the cropped image comprising the face;

determining a quality score of the face; and updating the second quality difference based on the quality score.

10. The computer-implemented method of claim 1, wherein the neural network comprises a hierarchy of inception modules, and wherein a first inception module in the hierarchy of inception modules is configured to receive an image as input.

11. The computer-implemented method of claim 10, wherein the neural network further comprises a convolutional kernel configured to generate a feature map from a heatmap generated from an input image, and wherein the feature map is input to a last inception module in the hierarchy of inception modules.

12. A non-transitory computer-readable storage medium comprising instructions that, upon execution on a computing system, cause the computing system to perform operations comprising:

providing a collection of images to a neural network, the neural network trained using training data comprising training images and associated training labels, wherein a training label associated with a training image indicates a quality measure for the training image, the neural network having associated parameters resulting from minimization of a loss function based on a first quality difference and a second quality difference, wherein the first quality difference is based on a training label associated with a first training image in the training images and a training label associated with a second training image in the training images, and wherein the second quality difference is based on an estimation of quality of the first training image and an estimation of quality of the second training image generated by the neural network;

generating, using the neural network, an estimation of quality for each image in the collection of images; and based upon the estimations of quality generated for the collection of images, selecting and storing a particular image from the collection of images.

13. The non-transitory computer-readable storage medium of claim 12, wherein the neural network is further trained by:

generating a heatmap from the first training image based on a recognition of a face present in the first training image;

generating a feature map based on the heatmap; and inputting the feature map to the neural network in association with inputting the first training image and the second training image to the neural network.

14. The non-transitory computer-readable storage medium of claim 12, wherein the collection of images corresponds to a plurality of successive images captured in a particular time frame.

15. The non-transitory computer-readable storage medium of claim 12, wherein the operations further comprise:

generating a thumbnail image based upon the selected particular image; and outputting the thumbnail image.

16. A system comprising:

a processing device; and a non-transitory computer-readable medium communicatively coupled to the processing device, wherein the processing device is configured to execute program code stored in the non-transitory computer-readable medium and thereby perform operations comprising:

providing a collection of images to a neural network, the neural network trained using training data comprising training images and associated training labels, wherein a training label associated with a training image indicates a quality measure for the training image, the neural network having associated parameters resulting from minimization of a loss function based on a first quality difference and a second quality difference, wherein the first quality difference is based on a training label associated with a first training image in the training images and a training label associated with a second training image in the training images, and wherein the second quality difference is based on an estimation of quality of the first training image and an estimation of quality of the second training image generated by the neural network;

generating, using the neural network, an estimation of quality for each image in the collection of images; and based upon the estimations of quality generated for the collection of images, selecting and storing a particular image from the collection of images.

17. The system of claim 16, wherein the neural network is further trained by:

generating a cropped image from the first training image based on a recognition of a face present in the first training image, the cropped image comprising the face;

determining a quality score of the face; and updating the second quality difference based on the quality score.

18. The system of claim 16, wherein the collection of images corresponds to a plurality of successive images captured in a particular time frame.

19. The system of claim 16, wherein selecting the particular image from the collection of images comprises selecting an image from the collection of images having a highest estimation of quality from among the estimations of quality generated for the collection of images by the neural network.

20. The system of claim 16, wherein the operations further comprise:

generating a thumbnail image based upon the selected particular image; and outputting the thumbnail image.

* * * * *